United States Patent [19]

van Meerbergen

[11] Patent Number: 4,761,734
[45] Date of Patent: Aug. 2, 1988

[54] DATA-PROCESSING APPARATUS PROVIDED WITH A FINITE-STATE MACHINE TO PERFORM A PROGRAM JUMP

[75] Inventor: Jozef L. van Meerbergen, Eindhoven, Netherlands

[73] Assignee: U.S. Philips Corporation, New York, N.Y.

[21] Appl. No.: 914,049

[22] Filed: Oct. 1, 1986

[30] Foreign Application Priority Data

Oct. 18, 1985 [NL] Netherlands ............... 8502848

[51] Int. Cl.[4] .................................. G06F 09/30
[52] U.S. Cl. ........................................ 364/200
[58] Field of Search ................. 364/200 MS File

[56] References Cited

U.S. PATENT DOCUMENTS 4,351,050 9/1982 Higashiyana .................. 364/200
4,554,630 11/1985 Sargent et al. ................ 364/200
4,689,738 8/1987 Van Wijk et al. .............. 364/200

Primary Examiner—Eddie P. Chan
Attorney, Agent, or Firm—James J. Cannon

[57] ABSTRACT

A data-processing apparatus having a processor, a read-write memory, a data bus, a program counter, a program memory and an instruction register. There is also a feedback finite-state machine possessing a multibit-wide output whose bits are determined in at least two successive machine cycles. This output is connected to a comparator which has its other input connected to the instruction register. A certain equality condition can invalidate the current instruction so that the latter acts as a rapidly performable dummy (NOP) instruction and a program jump can be performed. In a further expansion another multibit-wide output of the finite-state machine can be coupled to the data bus via a decoding circuit.

4 Claims, 3 Drawing Sheets

DATA-PROCESSING APPARATUS PROVIDED WITH A FINITE-STATE MACHINE TO PERFORM A PROGRAM JUMP

The invention relates to a data-processing apparatus with a finite-state machine to perform a program jump. The relevant state of the art is that represented by the U.S. Pat. No. 4,689,738, assigned to the assignee of this application.

The data-processing element performs operations on data and/or addresses. In complicated versions two or more operations can also be performed concurrently, e.g. in order to achieve a pipeline effect. The operations are performed under the control of a program which is built up from instructions. The program may be fixed but it is also possible to make the program modifiable. The patent application referred to above relates to an integrated and programmable processor for word-by-word digital signal processing, also sometimes called a vector processor. To that end there are incorporated, among other things, parallel data buses, a separate multiplication element, an arithmetic and logic unit, and separate address-processing elements. The present invention is also applicable to data-processing apparatuses which are designed as two or more integrated circuits and such as are not designed for vector operations but, for example, for general purposes, and data-processing apparatuses with a smaller range of facilities. However, it is also possible to implement still more of such facilities, e.g. a separate address bus and two or more data-processing elements.

Jumps occur in many programs: dependently or independently of a certain result of a previous operation, a choice has to be made between two or more subsequent operations. If a choice has to be made between two possibilities, there will be a branch point in the program. In the latter case, the structure of the program is often such that with a first result the program counter need only be incremented so that the number is increased by one unit. This costs little time because specialized components are provided for the purpose and, in particular, no information feed-in from (very) remote components of the apparatus need take place. For the performance of a program jump the program counter has to be loaded with new information, for which purpose this information has often to be supplied via the control bus. This operation costs extra time compared with direct incrementation. Moreover, extra instructions have in many cases to be written into the program to that end, so that the program becomes longer. The execution of these extra instructions also costs time. The above program relates to the program at the level of the data-processing apparatus (machine language) and not a program in a so-called higher-level programming language. In the latter, expressions of, for example, the form (*if* A *then* B *else* C), are possible. This last can, however, as generally known, only be made executable by a series of two or more machine instructions It is an objective of the invention to accelerate the execution of program jumps, particularly those which are conditionally executable, by a simple addition to components, while, furthermore, a large degree of flexibility is retained.

Finite-state machines as such have become known in their own right. The number of different states of such a component is finite and known. The various states are combined with each other in a network. This first implementation of the idea underlying the invention is favorable particularly in cases where only one instruction need be skipped. By performing the comparison in specially added components, great decision speed is achieved. In many cases this implementation has the same effect as if the program was provided with two different incrementation mechanisms, namely one which increases the "reading" by one and one which increases the "reading" by two. By repeating the mechanism with the dummy instruction two or more times, it is possible with the same components to skip a series of instructions in a jump over two or more storage locations. Doing this with a dummy operation is more advantageous than providing the program counter with a second incrementation facility whereby the program counter would be advanced by two. In the latter case the mutual synchronization between various operations to be performed on a pipeline basis would not be maintained. And, particularly in more complicated data-processing apparatuses, a pipeline organization of this kind itself contributes much to the high processing speed. With a dummy operation, which itself costs some time, the pipeline organization remains unaffected.

It is an advantage if the said finite-state machine incorporates a first decoding circuit one output of which is connected to another register, if outputs of said other register are connected to the comparator and also fed back to the first decoding circuit, and if the first decoding circuit is also connected to a character-signal output of the processor. This is a particularly simple version of the finite-state machine. Other versions, however, can also be of advantage.

It is an advantage if the said output register is provided with another parallel output for addressing a second decoding circuit (XROM) and an output of the second decoding circuit is connected to the said data bus. The finite-state machine can then provide information to be used in other components of the computer apparatus.

It is an advantage if means of control are available to couple an output of the said second decoding circuit in a loading operation to a data input of the program counter. In particular, this makes immediate loading of the program counter possible without need for access to the program memory and for further, protracted operations.

Further advantageous aspects will be stated in another subsidiary claim.

The invention will be further explained with reference to some figures, but first, by way of clarification, the existing state of the art will be examined, then the expansion of a data-processing apparatus in accordance with the invention, and finally examples will be given of the acceleration of performance and the simplified structure of the (part of the) program to be performed.

Tables 1 to 14 give illustrations to accompany various algorithms.

DESCRIPTION OF THE PREFERRED EMBODIMENTS

Figure 1:
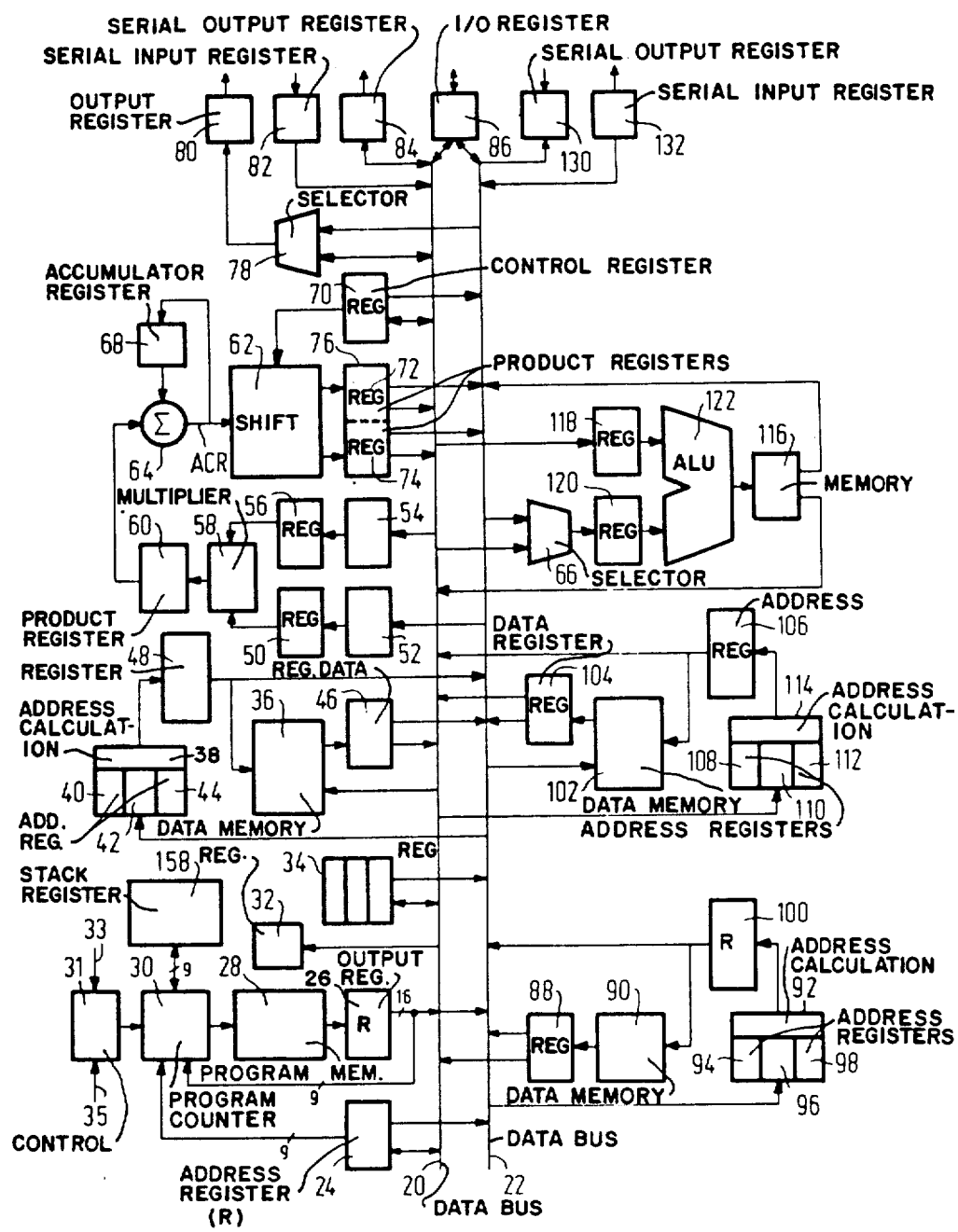
FIG. 1 shows a block diagram of a vector processor.

FIG. 1 shows a block diagram of a vector processor according to the patent referred to above. As already stated, the invention can also be applied to other categories of data-processing apparatus. The block diagram is intended to be integrated on a single substrate element (chip). The internal connection is effected by a first 16-bit information bus 22 and a second 16-bit information bus 20. Together these form the data bus which is also used for addresses. The circuit comprises a number of registers of which some are connected directly to one or both buses, namely elements 24, 26, 34, 46, 48, 50, 56 (the last two via a selection element), 70, 72, 74, 88, 100, 104, 106, 118, 120 and 116. Element 30 is a program counter and addresses a program memory 28 with a capacity of 512 40-bit words which can be loaded in the instruction register 26. In these instructions most bits control further functions in the rest of the circuit via connections, for simplicity's sake not further indicated, which together form part of a control bus. A 16-bit part can also be taken to the data bus, namely to the two information buses 20 and 22. Program counter 30 can be incremented to the next higher position. Additionally, program counter 30 is loadable either by nine bits from the instruction register 26 or by an address from selecting register 24, or with an address from 8-word stack register 158. Register 24 operates as an address register and is connected to both buses (namely in the same manner as elements 34, 70 and 78: unidirectionally with bus 22 and bidirectionally with bus 20). In a simple version the loading mechanism of program counter 30 is only provided from the output of instruction register 26. In addition to said outputs from the instruction register 26, which together form part of the control bus, other control lines not described here also form part of the latter.

Element 90 is a data memory which in this example takes the form of a read-only memory for 512 16-bit words. Furthermore, elements 36 and 102 are data-memory modules, elements 38, 92 and 114 address-computation units, and elements 66 and 78 selectors for the two buses. Registers 48, 100 and 106 belong to the address-computation units which, for the sake of brevity, will not be explained further. Additionally, some registers have, as shown (for example 88, 104, 46, 72, 74 and 34), selecting connections to the two buses. Registers 50 and 56 act as registers which may or may not be transparent. Element 58 is a 16×16-bit multiplication element. Element 64 is a 40-bit accumulator/adder. Element 68 is a 40-bit accumulator register. Element 78 is a bidirectionally operating selector. Element 122 is an arithmetic and logic element. Element 116 is a memory with three ports which is used as a collection of scratchpad or working memories. Furthermore, elements 80, 82, 84, 86, 130 and 132 are input/output units for communication with the outside world.

The registers have the following functions:
48: instantaneous address register for RAM 36 (ARA)
46: data register at the output of RAM 36 (DRA)
106: instantaneous address for RAM 102 (ARB)
104: data register at output of RAM 102 (DRB)
50, 56: two registers, working transparently or not, at the inputs of the multiplication element (MXL, MYL)
60: product resistor (PR)
68: accumulator register (ARC)
72, 74: register parts for, respectively, the most significant and the least significant part of product (MSP, LSP)
70: register for controlling the shift element 62 (BSR)
118, 120: two registers, operating transparently or not, at the input of ALU 122 (AXL, AYL)
116: fifteen scratchpad registers (R0 . . . R14)
40, 94, 108: base-address registers (AA, RA, BA)
42, 96, 110: shift-address registers (AS, RS, BS)
44, 98, 112: address-masking registers (AM, RM, BM)
84, 132: serial output registers for the two buses (SOX, SOY)
82, 130: serial input registers for the two buses (SIX, SIY)
86: multiplexed parallel input/output register (PO, PI)
80: additional parallel output register (ADO).

Subject to synchronization by a clock not indicated separately, the data processor can carry out up to 10 million machine instructions per second. This is possible because two or more instructions can be executed in parallel by means of a pipeline organization. In this process two information buses operating in parallel are used to speed up transport. Communication with the outside world is catered for by I/O adapter units for both serial and parallel communication. Three data memories are provided, namely two read-write memories and one read-only memory, each of which is provided with its own address-computation unit. The multiplication element 58 is combined with a 40-bit accumulator 64/68 and shift unit 62 for general purposes.

Figure 2:
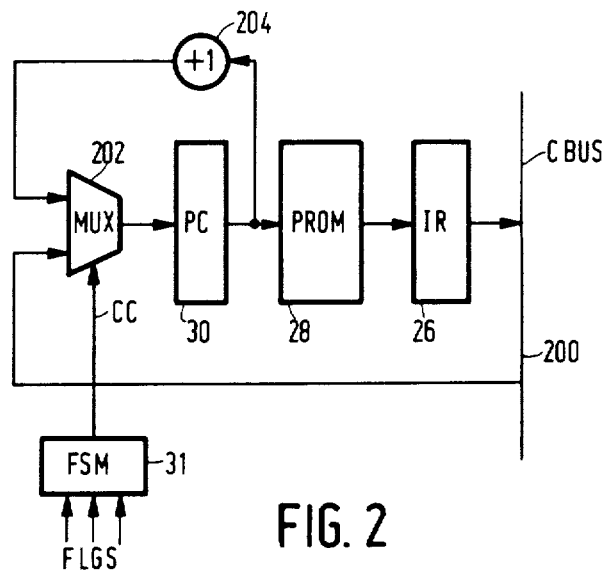
FIG. 2 shows a known solution in detail.

Two preferred embodiments of the invention will now be described, in which description, for the sake of brevity, only the environment of the program counter, the program memory and the instruction counter will be given. For the purpose of comparison, FIG. 2 gives a basic block diagram of a simple example of the known solution. The elements have numbers similar to those in FIG. 1, so that program counter 30, program memory 28 and instruction register 26 are shown. The feed-back from register 26 to program counter 30 passes via control bus 200 and multiplexer 202. Control bus 200 also conveys control signals to various kinds of elements in the data-processing apparatus, such as a data-processing element, a read-write memory and a connecting element for connection to the outside world. The width of program counter 30 is generally much smaller than that of instruction register 26 (if desired, register 26 can incorporate an output decoder in order to pass on the control bits decoded). Element 204 is an incrementer. This element may be a structural facility within the program counter, whereby the counting function is achieved with the passing-on of transfer information between succeeding counter stages. If multiplexer 202 is conducting for the top input, the program counter value will be increased by 1. If multiplexer 202 is conductive for the bottom input, program counter 30 will be loaded with new information. Control of multiplexer 202 is effected by control unit 31. This may, for example, be another finite state machine, known in its own right, which is controlled by a number of flag bits (FLGS) in order to issue the control code bit(s) CC. Thus the following functions, for example, can be performed:
 a call instruction
 a jump instruction
 a return instruction; for this purpose a register stack, not shown, is required, one output of which is connected to multiplexer 202
 a repetition instruction.

The multiplexer 202 can also be connected to the data bus (see also FIG. 1) in order to derive an item of information, for example from the data-processing element or from a memory. For the sake of simplicity, the control at the level of the clock-pulse cycle is not shown. The internal structure of finite-state machine 31 is not shown, either. It can also, for example, take the form of a single decoder, i.e. without a feedback mechanism as in the case in the finite-state machine in FIG. 3.

Figure 3:
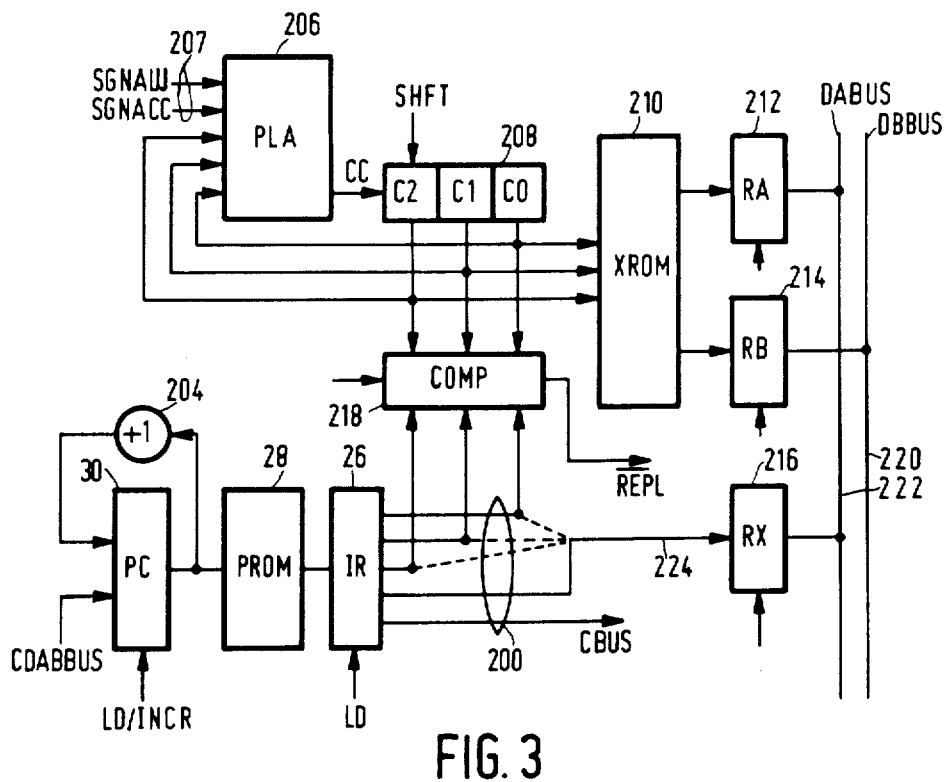
FIG. 3 shows at two successive levels improvements which can be achieved with the invention.

FIG. 3 shows, in two successive levels, improvements which can be achieved in accordance with the invention. At a first level the additions are the elements 206, 208 and 218. The lower part of the figure corresponds largely to FIG. 2. The multiplexer is not shown separately but the control signal LD/INCR for the program counter which selects as between loading and incrementing is. Loading in this case can be effected via either the control bus CBUS or one of the two data buses DABUS and DBBUS. The latter is a "load immediate" operation. Also shown is a loading signal LD for instruction register 26. The second input of program counter 030 is shown as CDABBUS. If desired another finite-state machine like element 31 in FIG. 2 is provided. The control within a machine cycle is not shown. The control signals LD for elements 30 and 26 need therefore not be dependent and synchronous.

Block 206 represents a programmable logic arrangement (PLA). It sends out a condition code (CC), which in this case has the width of one bit. This bit is stored under the control of a control pulse (SHFT) and shifted on into a shift register 208, which in this case has a bit length of three.

A parallel output of this register is connected to the comparator COMP (218). The other parallel outputs from register 208 are fed back to inputs of programmable logic arrangement 206. This last element thus continuously forms a condition code bit which is stored under the control of successive shift pulses.

Elements 206 and 208 thus form together a (second) finite-state machine. This is also controlled by condition signals; in this case these are, for example, the value of the sign bit in an output result from the arithmetic and logic unit (SGNALU). A second condition signal (SGNACC) is the value of the sign bit in an output result from the accumulator (which is located at the output side of the multiplier in FIG. 1).

Individually, the second finite-state machine can be arrived at in a different manner. The aim is merely that a multi-bit quantity should be available for comparison at a parallel output. Thus two or more condition code bits can be issued simultaneously. The shifting can also be controlled in another means. It can, for example, be effected by means of a limited selection from the stock of instructions. If two or more condition-code bits are emitted in parallel, they can be taken in parallel to various shift registers which receive mutually independent shift pulses. Nor is it necessary that the elements 206 and 218 receive the same bit selections. However, it is essential here for condition code bits from different successive instruction periods to be present, so that the finite-state machine can work at a more complicated level than a decoder. As stated, this limitation need not apply to the first finite-state machine 31 in FIG. 2.

The instruction register 26 has several outputs. In the first place, there are as many outputs connected to the bottom input of comparator 218 as the latter has top inputs from (here) shift register 208. A connection 224 is also connected via register RX (216) to an information bus, in this example only to information bus 222. Also, as stated, there is a connection to the control bus (CBUS). The three outputs described together form all the outputs of instruction register 26. They may or may not (partly) coincide. The application of instruction bits to data and/or control buses is described in the reference quoted and will not be explained further. Thus it is possible, by continuous incrementing of program counter 30, to call up a series of successive instructions from the program memory 28 and to execute them. Additionally, the program counter can be loaded via one or more of the three buses CBUS, DABUS and DBBBUS, jointly indicated symbolically as the input CDABBUS.

The expansion consisting of the finite-state machine and comparator is now used in the following manner: if the comparator 218 (which is activated by an indicated synchronization signal) indicates that a first equality condition, e.g. "not equal", exists, then the output control signal $\overline{REPL}$="1" and nothing special happens, which means that the normal operation is then performed: either the instruction is executed and then the program counter is incremented or the program counter is loaded via the CDABBUS input. The validity signal VALID (not shown in the figure) has the inverse value with respect to $\overline{REPL}$. The logic used has an "active-low" level. In the event that the second equality condition exists, e.g. "equal", then the output control signal $\overline{REPL}$ is equal to "0". This has the consequence that the program counter is then incremented and that the instruction appearing in the instruction register 26 is regarded as a dummy instruction NOP, so that it does not give rise to any data-processing operation. Next, the program counter is again incremented in the following machine cycle and the then following instruction in instruction register 26 is executed. In this way it is possible to skip an instruction, which means very rapid execution of a jump operation without a relatively time-consuming operation to load the program counter being necessary. An example of application will be given below.

Provided at a second level of expansion are a second decoding circuit, here a read-only memory XROM (210), a register RA (212) and a register RB (214). Decoding circuit 210 in this example receives the same bit as comparator 218 and arrangement 206. These three bits are decoded in order to be able to apply an item of information to one or both data buses. The information can be applied via the data bus or to the program counter in a "load" immediate" operation, or to other elements of the data-processing apparatus. In the first case in particular, no memory access is required, which results in great speed. The use of this addition will be discussed later. In this case, too, it is not necessary for the decoding circuit 210 to receive the same bit selection as comparator 218 and arrangement 206. It will be clear that this further expansion can also be used if there is only one information bus, and also for the application of information to a specific address if present, e.g. a memory position or a register. If circumstances so require, the meanings of the two equality conditions described can be interchanged, if desired under the control of an extra signal. It is also possible to control certain bit positions of the comparator 218 in a "don't care" mode with a specific control signal.

Figure 4:
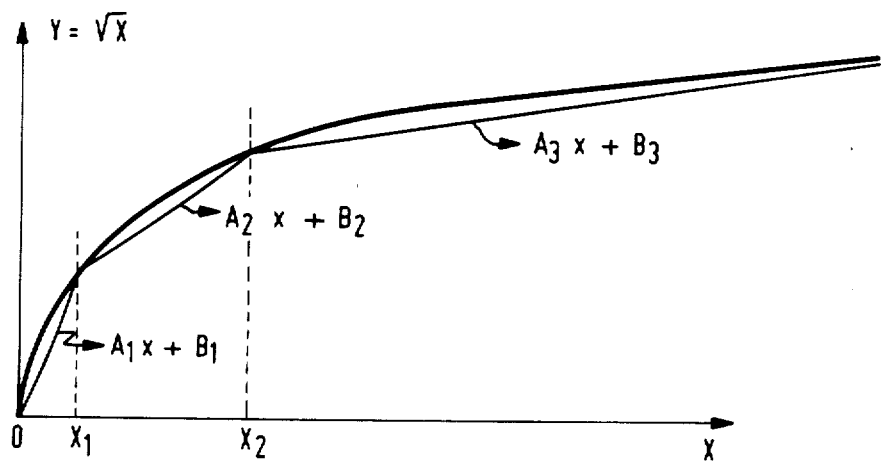
FIG. 4 illustrates a problem to be solved.

FIG. 4 illustrates a problem to be solved, in this case the computation of an approximation of a parabolic function: $y=(x)^{\frac{1}{2}}$, with the aid of six coefficients A(1 . .

Figure 5:
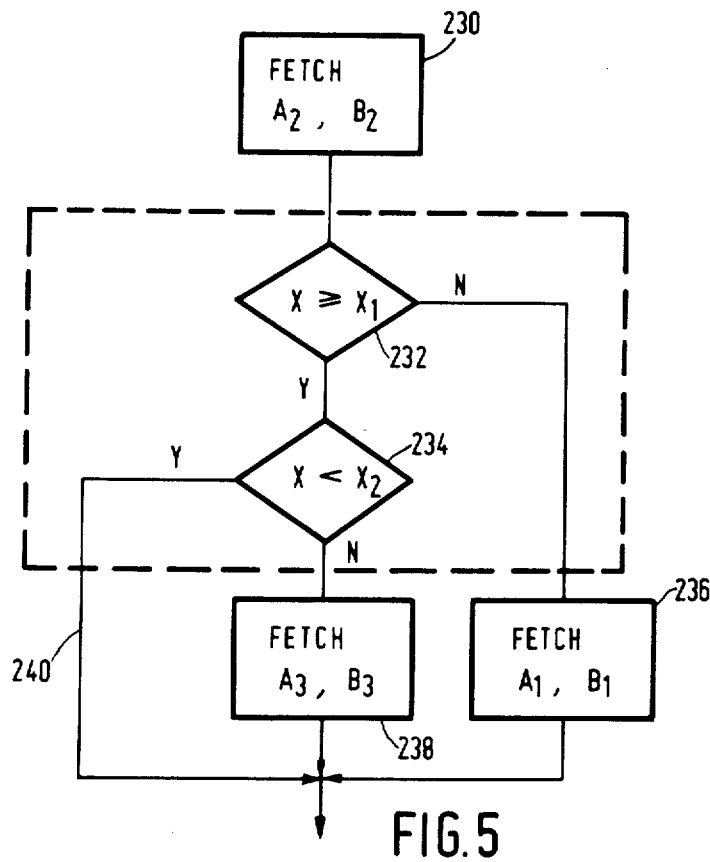
FIG. 5 shows a flow diagram relating thereto.

. 3), B(1 . . . 3). FIG. 5 gives a flow diagram to accompany it. In block 230 two coefficients are fetched (after the keying-in of a starting operation which, for the sake of simplicity, is not shown). In blocks 232 and 234 a detection operation determines in which range the value of x occurs. Depending on the result, two other parameter values are fetched in 236 and 238, or else a dummy operation (240) is executed. Then the value of the function itself is determined and, if necessary, used, but, for the sake of brevity, the latter will not be discussed further.

Table 1 shows the sequence of execution on the architecture in FIG. 2. Because of the pipelines between the program counter, the program memory and the instruction register, every jump has to be followed by a "NOP" instruction. This implementation requires 14 instructions in the program memory. The number of execution cycles may vary but is at most 10.

The solution in FIG. 3, first level (without decoding memory 210) can perform the same algorithm more efficiently. In principle the microcode takes the following form: <opcode> <source X> <source Y> <dest X> <dest Y> <ACU> <COND> <FSM.> The fields given in the patent application referred to respectively contain the operation code, two source elements which supply an item of data for the two information buses, two elements relating to destinations for which these two items of data are intended, and an item of information (ACU) for the address computation units. Compared with the microcode in the patent application referred to, two special fields have been added, namely COND and FSM.

(a) FSM field

The FMS field can be controlled independently of the rest of the instruction and parallel to it. The user can define a number of instructions, for example SHSET: shifts condition bits and puts a new CC condition code bit similar to the sign of the present ALU result SET: as the preceding, but rewrites the condition bit C2

COUNT: shifts condition bits if CC=1 (see below).

In order to be able to define these three instructions, the FSM field must contain at least two bits.

(b) COND field

If there are three condition bits (C3, C2 and C1), then this is a field of 3 bits in which a certain code can be written, e.g. <instruction> <001>: this instruction, specified by <instruction>, will only be executed if C3=C2=0 and C1=1.

If different choices have to be made at two or more places in a program, this field is also used to identify the respective places, which usually makes one or more extra bit positions in the field necessary.

If an instruction has to be suppressed, this can be done with the REPL signal. The destination elements are then all switched to a do-nothing (NOP) condition and all arithmetic processing blocks (ALU, address-computation elements, multiplier) in the data-processing apparatus switch to the holding mode as was described for the known data-processing apparatus.

The execution is illustrated in table 2. Implementation requires 8 instructions in the program memory. The number of execution cycles is also 8.

The solution in FIG. 3, second level (with the second decoding circuit 210), can perform the same algorithm more efficiently. The condition bits are also used as address bits for the second decoding circuit (X-ROM). If a read operation occurs, the data end up in one or both of registers RA and RB. These are two ordinary registers forming part of the data path, i.e. controlled by the normal source-indication fields. In some cases (such as in the example) a single register (RA) may also suffice.

The execution is illustrated in table 3; the contents of decoding circuit 210 and the data memory (e.g. memory 102 in FIG. 1) are shown in table 4.

Tables 5, 6 and 7 show the working out of a second example for the same three solutions, namely: an array of 8 elements is given. The question is: how many elements smaller than a certain number (U)? This example will be worked out with straight-line coding, i.e. without loops or subroutines. The first solution costs four instructions per element of the array. The second solution costs two instructions per element. The third solution costs only one instruction per element: at the end the decoding memory contains the counter reading. Shift register 208 now has room for 8 condition bits. The memory XROM contains nine words with contents as shown in table 8. The expansion of the data-processing apparatus needed for the second example can also be used for the first example, by, in the first example, giving five other bits of the register corresponding to register 218 a "don't care" status. This can be done by, for example, dividing the comparator into a left-hand part (three bits) and a right-hand part (five bits). The right-hand part would then be ignored for the first example. The equality condition can thus also imply only a partial equality/inequality.

Tables 9, 10, 11 and 12 similarly show the working-out of a third example. Given: three numbers a, b and d. Required: to find the middle one of the three. For a larger number of numbers the median can likewise be found. For every possible combination of two numbers the shift register has to be able to contain one bit, hence three bits for three numbers and ten for five numbers and a total of $\frac{1}{2}n(n-1)$ for n numbers. Here again, it can be said that, if the capacity of the shift register or the address length of the decoding circuit XROM is sufficient, all the examples stated can be implemented.

For each of the three problems I, II and III shown and for each of the three solutions A, B and C, table 13 gives first the necessary number of instructions and then the number of machine cycles necessary for implementation.

In order to show how powerful this architecture is for taking decisions, the third example can be expanded to make a median filter. A continuous stream of input samples then arrives (namely a, b, c, d, . . . ) and every so often, an output sample has to be computed which is equal to the middle value of the last three samples to arrive. The use of the shift register for the condition bits will prove very useful here. The program is shown in table 14.

The components described can be embodied in various ways. The decoding circuit (206 and 210 in FIG. 3), for example, can take the form of a programmable logic arrangement (PLA or FPLA), as a PROM, ROM or RAM, or even as wild logic.

NOTES ON THE TABLES

Table 3, line 3: for performance reasons an extra cycle is inserted here; line 4: use in hold register RA as direct address for the data RAM. The read operation thereafter may then be A1, A2, or A3; tables 5 and 6: "TELLER" is counter.

TABLE 1

```
        fetch A2
        fetch B2
        X — X1 , set CC
        if CC = 0 goto '1'
        nop
        fetch A1
        fetch B1
        goto 'end'
        nop
    1   X — X2 , set CC
        if CC = 1 goto 'end'
        nop
        fetch A3
        fetch B3
    end continue
```

TABLE 2

```
X — X1 , SET      : set C1
X — X2 , SHSET    : set C2 and shift C1
fetch A2
fetch B2
fetch A1 , cond <−1> : fetch A1 if C2 ="don't care" and C1=1
fetch B2 , cond <−1> : idem
fetch A3 , cond <00> : fetch A3 if C2 =C1=0
fetch B3 , cond <00> : idem
```

TABLE 3

```
X — X1 , SET      : set C1
X — X2 , SHSET    : set C2 en shift C1
read X-ROM
RA →         ACU , fetch A :
INCR         ACU , fetch B
```

TABLE 4

| X-ROM | | dat-RAM | |
| --- | --- | --- | --- |
| add (C2,C1) | cont | add | dat |
| 0  0 | 4 | 0 | A1 |
| 0  1 | 2 | 1 | B1 |
| 1  0 | 0 | 2 | A2 |
| 1  1 | 2 | 3 | B2 |
|  |  | 4 | A3 |
|  |  | 5 | B3 |

TABLE 5

```
        TELLER = 0
        X(1) — U , set CC
        if CC = 0 goto 1
        nop
        inc TELLER
    1   X(2) — U , set CC
        if CC = 0 goto 2
        nop
        inc TELLER
    2 ...
      ...
    7   X(8) — U , set CC
        if CC = 0 goto 8
        nop
        inc TELLER
    8 continue
```

TABLE 6

```
        TELLER = 0
        X(1) — U , SET C1
        inc TELLER , cond <0>
    1   X(2) — U , SET C1
        inc TELLER , cond <0>
    2 ...
      ...
    7   X(8) — U , SET C1
        inc TELLER , cond <0>
```

TABLE 6-continued

```
    8 continue
```

TABLE 7

```
X(1) — U , COUNT
X(2) — U , COUNT
X(3) — U , COUNT
X(4) — U , COUNT
X(5) — U , COUNT
X(6) — U , COUNT
X(7) — U , COUNT
X(8) — U , COUNT
read X-ROM
```

TABLE 8

| add | dat |
| --- | --- |
| 00000000 | 0 |
| 00000001 | 1 |
| 00000011 | 2 |
| 00000111 | 3 |
| 00001111 | 4 |
| 00011111 | 5 |
| 00111111 | 6 |
| 01111111 | 7 |
| 11111111 | 8 |

TABLE 9

```
        a — b , set CC
        if CC = 1 goto 1
        nop
        b — d , set CC
        if CC = 1 goto 2
        nop
        read b
        goto 'end'
        nop
    2   a — d , set CC
        if CC = 1 goto 3
        nop
        read d
        goto 'end'
        nop
    3   read a
        goto 'end'
        nop
    1   b — d , set CC
        if CC = 1 goto 4
        nop
        a — d , set CC
        if CC = 1 goto 5
        nop
        read a
        goto 'end'
        nop
    5   read d
        goto 'end'
        nop
    4   read b
    end continue
```

TABLE 10

```
a — b  , SET       : set C1
b — d  , SHSET     : shift C1 and set C2
a — d  , SHSET     : shift C1 and C2 and set C3
read b , cond <−11>
read d , cond <101>
read a , cond <001>
read a , cond <110>
read d , cond <010>
read b , cond <−00>
```

TABLE 11

```
a — b  , SET       : set C1
```

TABLE 11-continued

| | | |
|---|---|---|
| b − d , SHSET | : shift C1 and set C2 | |
| a − d , SHSET | : shift C1 and C2 and set C3 | |
| read X-ROM | | |
| RA → ACU , read data RAM | | |

TABLE 12

| X-ROM | | data RAM | |
|---|---|---|---|
| add (C3,C2,C1) | cont | add | data |
| 0 0 0 | 2 | 1 | a |
| 0 0 1 | 1 | 2 | b |
| 0 1 0 | 3 | 3 | d |
| 0 1 1 | 2 | | |
| 1 0 0 | 2 | | |
| 1 0 1 | 3 | | |
| 1 1 0 | 1 | | |
| 1 1 1 | 2 | | |

TABLE 13

| | A | B | C |
|---|---|---|---|
| I | 14 | 8 | 5 |
| II | 4 | 2 | 1 |
| III | 32 | 9 | 5 |
| | A | B | C |
| I | 10 | 8 | 5 |
| II | 4 | 2 | 1 |
| III | 12 | 9 | 5 |

TABLE 14

| | | | |
|---|---|---|---|
| | a →Ram(1) | | |
| − a + b , | b →Ram(2) | , SHSET | : set C1 |
| c − b , | c →Ram(3) | , SHSET | : shift and set C2 |
| | read a | | |
| − a + c , | | , SHSET | : shift and set C3 |
| | | read X-ROM | |
| | | read OUT1 | |
| d − c , | d →Ram(4) | , SHSET | : shift and set C4 |
| | read b | | |
| − b + d , | | , SHSET | : shift and set C5 |

What is claimed is:

1. A data-processing apparatus comprising a processor, a read-write memory, an interface element for connection to the "outside world" and a data bus to connect said components to each other, and also comprising a program counter, a program memory addressed by the program counter, an instruction register connected to a data output of said program memory, and a control bus connected to said instruction register to apply control signals to said processor, said read-write memory and said interface element; said program counter being provided with means to perform, in a first alternative, an incrementation operation by means of an incrementation element (204), or, in a second alternative, a loading operation, and having for that purpose a data input connected to said control bus in order to receive a jump address for the execution of a first program jump, said first or second alternatives being selected by a control signal from said instruction register; said instruction register further providing signals for the execution of a second program jump via a feedback finite-state machine (206, 208), said finite-state machine comprising a first decoding circuit (206) connected to an output register (208); in which outputs from said output register are fed back to the first decoding circuit, and in which said first decoding circuit is fed a sign-signal output (207) from said processor, said output register (208) having a multibit-wide information output whose content bits are formed in at least two successive machine cycles, wherein said multibit-wide information output is connected to a comparator (218) to supply a condition code to said comparator, which comparator is also supplied by outputs from said instruction register in order, upon detection of a first equality condition (unequal) between said supplied items of information, to validate a current instruction or, upon detection of a second equality condition (equal) between said supplied items of information, to invalidate, in a third alternative, said current instruction, so that said current instruction operates like a dummy instruction (NOP) and a subsequent instruction is then activated.

2. A data-processing apparatus as claimed in claim 1, said output register of said finite state machine is provided with a parallel output for addressing a second decoding circuit (XROM), and in which an output of said second decoding circuit is connected to said data bus (220, 222).

3. A data-processing apparatus as claimed in claim 2, in which control elements are incorporated in order to couple an output of said second decoding circuit in a loading operation with a data input of said program counter.

4. A data-processing apparatus as claimed in claim 1, in which said apparatus is designed as a signal processor mounted on a single substrate element (chip); and said processor includes a separate multiplier and a separate arithmetic and logic unit which are coupled with said data bus and with said control bus.

* * * * *